Patented Oct. 17, 1922.

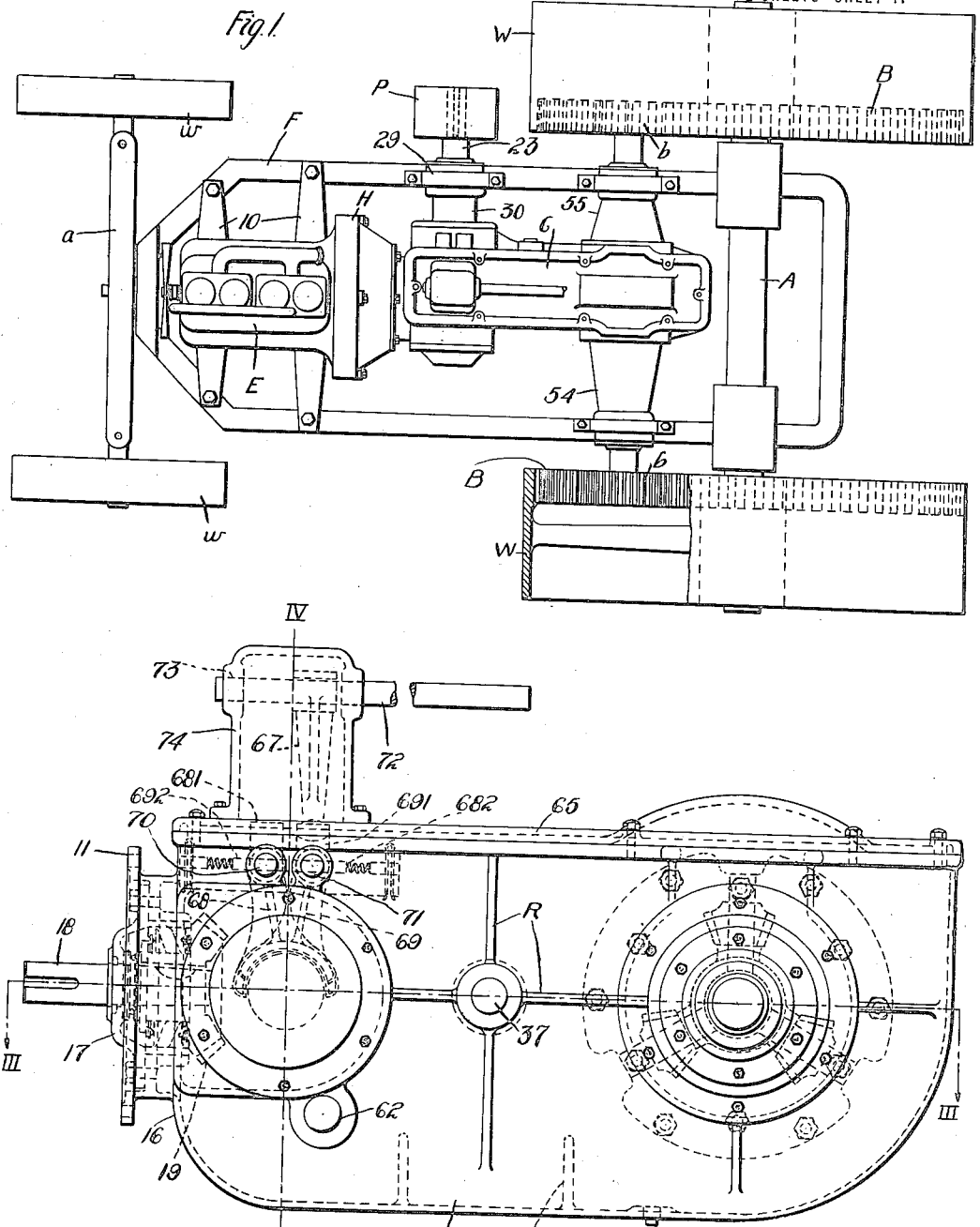

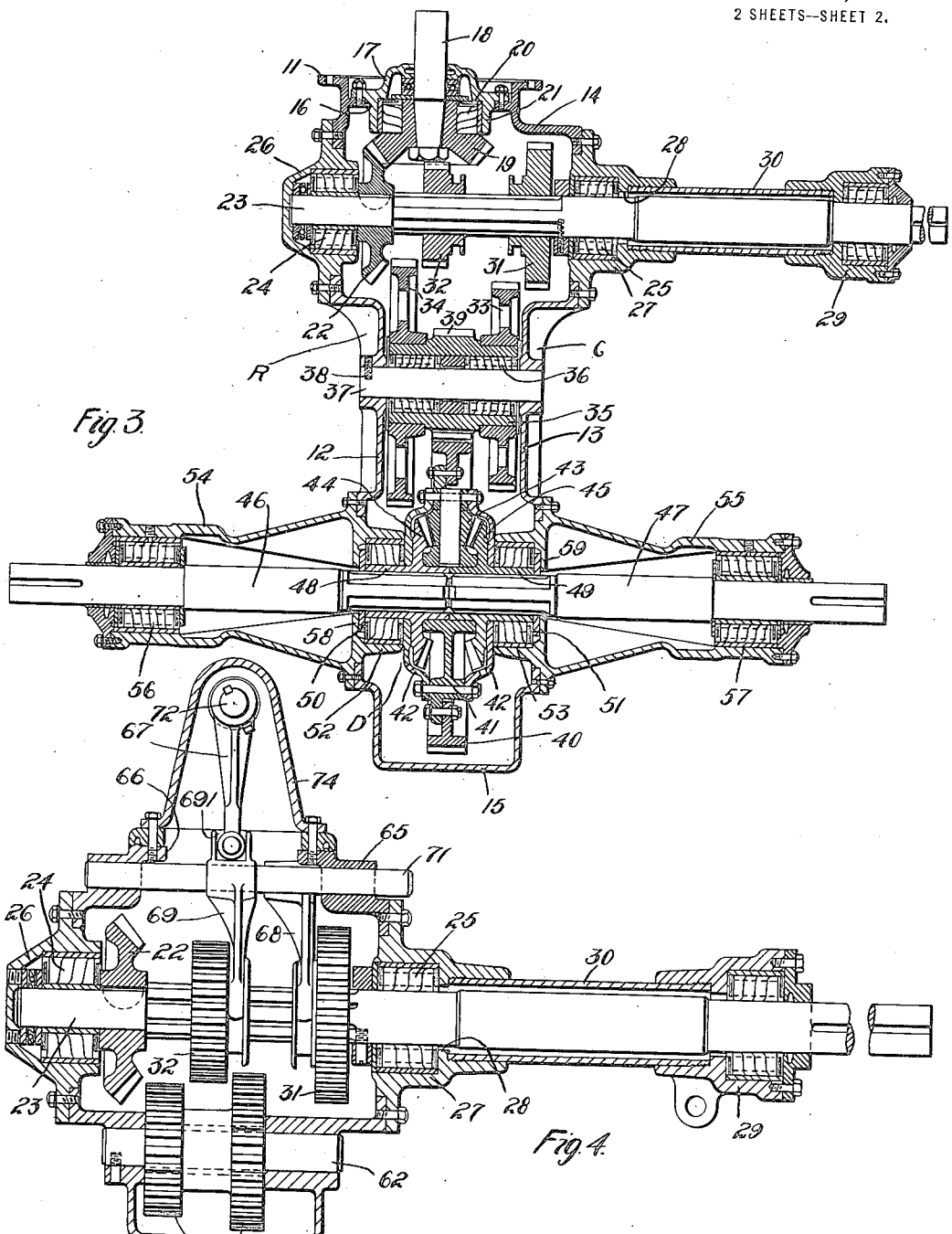

1,431,958

UNITED STATES PATENT OFFICE.

LESTER H. KEIM, OF CHICAGO, ILLINOIS, ASSIGNOR TO R. D. NUTTALL COMPANY, A CORPORATION OF PENNSYLVANIA.

TRANSMISSION MECHANISM.

Application filed February 1, 1918. Serial No. 214,810.

*To all whom it may concern:*

Be it known that I, LESTER H. KEIM, a citizen of the United States, and a resident of Chicago, in the county of Cook and State of Illinois, have invented a new and useful Improvement in Transmission Mechanisms, of which the following is a specification.

This invention relates to transmission mechanisms for vehicles, and the principal object of the same is to provide a transmission that shall be particularly suitable for use on comparatively heavy-duty vehicles, such as tractors and trucks.

Another object of this invention is to provide a completely enclosed change-speed and reduction gearing in which distortion strains in the casing and gearing are greatly reduced by arranging the parts of the transmission gearing symmetrically with respect to the longitudinal central plane of the casing.

A further object of the invention is to provide a compact, rugged transmission mechanism in which the change-speed gearing and the differential gearing are totally enclosed in a dust-excluding casing that is adapted to contain oil for lubricating the wearing parts of the mechanism.

Another object is to provide a reduction gearing that shall include a counter-shaft of novel construction, consisting of a toothed sleeve carrying change-speed gears on opposite sides of the toothed portion of the sleeve.

Another object of the invention is to provide an enclosing casing for the transmission mechanism which shall have detachable parts so that the members within the casing may be readily examined, removed or replaced.

The above and other objects and the novel features of the invention will be apparent from the following description taken in connection with the accompanying drawing in which Fig. 1 is a plan view of a tractor equipped with a transmission mechanism embodying this invention; Fig. 2 is a side elevation, on a larger scale, of a transmission casing embodying my invention, parts within the casing being indicated in dotted lines; Fig. 3 is a horizontal sectional view of the transmission mechanism taken on the line III—III of Fig. 2, and Fig. 4 is a vertical sectional view of the mechanism taken on the line IV—IV of Fig. 2.

Referring to Fig. 1, the invention is shown as applied to a common type of gas-engine-driven farm tractor, but it is to be understood that the invention may be applied to other types of vehicles, as will be readily understood by those skilled in the art. The tractor illustrated comprises a frame F of any suitable construction supported, at its rear end, on a rear axle A, carried by the main tractor wheels W. The front end of the frame F is mounted on the axle $a$, which is supported by the front steering wheels $w$. An internal-combustion engine E, of any suitable type, is mounted on cross braces 10 secured to side members of the frame F at the front end thereof. The crank shaft (not shown) of the engine E extends into a fly-wheel-and-clutch housing H that is bolted to the flange 11 at the front end of the combined change-speed transmission and differential casing C.

The casing C is substantially rectangular and trough-shaped, embodying parallel side walls 12 and 13, end walls 14 and 15 and a bottom wall 16. The front end of the casing C has an opening 16 within the flange 11, and a removable cap 17 covers the opening 16 and also provides a bearing for a propeller shaft 18 that extends into the front end of the casing. The opening 16 is of sufficient size to permit the insertion and removal therethrough of a bevel pinion 19 secured to the inner tapered end of the propeller shaft 18. The propeller shaft 18 is connected to a clutch mechanism (not shown) in the bell housing H, and bearings 20, between the flange 21 of the cover and the hub of the pinion 19, rotatably support the propeller shaft in the cap 17. The bevel pinion or gear 19 meshes with a bevel pinion or gear 22 keyed to a driving shaft 23 that is rotatably supported in bearings 24 and 25 in the removable caps 26 and 27, respectively. The caps 26 and 27 fit in openings in the side walls 12 and 13, respectively, of the transmission casing C. The cap 27 has an opening 28 extending therethrough, and the outer end of the shaft 23 passes through the said opening and is supported by a bearing 29 mounted on a side member of the frame F. The end of the shaft 23 that projects outside the frame F is arranged to carry a pulley P that is used for driving farm machinery from the engine E when the vehicle is stationary. The cap 27 and the bearing 29 are connected by a sleeve 30 that encloses the shaft 23 and also assists in supporting the front end of the casing C from the frame F.

The shaft 23 has a high-speed spur pinion 31 and a low-speed spur pinion 32 splined on the part thereof between the bevel gear 22 and the opposite wall of the casing. The high and low-speed pinions 31 and 32 are adapted to be moved longitudinally of the shaft 23 into, and out of, mesh with the high and low-speed gears 33 and 34 by a mechanism to be described. The high and low-speed gears 33 and 34 are keyed to a sleeve 35 supported by bearings 36 on the countershaft 37 that is secured in a stationary position in the side walls 12 and 13 by a set screw 38. The length of the sleeve 35 is substantially the same as the distance between the walls 12 and 13, sufficient clearance being allowed at each end, and the gears 33 and 34 have hollow hubs that are keyed to the opposite ends of the sleeve. A circular row of spur gear teeth is cut on that part of the sleeve between the gears 33 and 34 to form a sleeve pinion 39 rotatable by the gears 33 and 34.

The sleeve pinion 39 is located substantially in the longitudinal central plane of the gear case C and meshes with an external spur gear 40 of a differential mechanism D also symmetrically disposed with respect to the longitudinal central plane of the transmission casing. The external gear 40 of the differential D is bolted to the differential spider 41 which carries the three differential bevel pinions 43. The differential bevel pinions 43 mesh with two opposing differential bevel gears 44 and 45 secured to the driven shafts or axles 46 ant 47, respectively. The differential side plates 42 absorb the thrust of the bevel gears 44 and 45 and hold them in place. The differential gears 44 and 45 are provided with cylindrical hub flanges 48 and 49 which surround the inner ends of the axles 46 and 47 and support the latter in bearings 50 and 51. The bearings 50 and 51 are carried by inwardly extending flanges 52 and 53 on the sleeves 54 and 55 that surround the axles 46 and 47 and carry outer bearings 56 and 57 mounted on the side parts of the frame F so as to support the said axles. The inner ends of the axle sleeves 54 and 55 are bolted to flanges surrounding openings in the side walls 12 and 13 of the casing C to support the rear end of the latter on the frame F, and the bearings 50 and 51 are confined axially by the differential housing and by inwardly extending flanges 58 and 59 of the sleeves 54 and 55 disposed perpendicular to the flanges 52 and 53, respectively. The outer ends of the axles 46 and 47 carry the bull pinions $b$ that mesh with internal bull gears B on the tractor wheels W.

The side walls of the casing C are provided with exterior ribs R to reinforce them, and ribs R' in the bottom of the casing which prevent the flow of lubricant out of certain parts of the casing when the same is inclined. The reversing gears 60 and 61 are mounted on the shaft 62, secured in the side wall of the casing below, and slightly to one side of, the shaft 23, the gear 60 being in mesh with the low speed gear 34, and the pinion 32 being adapted to be connected to the gear 61.

A cover 65 is bolted to, and closes, the trough-like case C at the top. The cover 65 has an opening 66 to admit an arm 67 for operating the yokes 68 and 69 which have forked portions fitting in grooves on the hubs of the change-speed pinions 31 and 32, respectively. The yokes 68 and 69 are carried by rods 70 and 71, respectively, slidably mounted in the cover 65 below the opening 66. The shifting arm 67 is rigidly secured to, and is longitudinally movable by, a rotatable shifting rod 72 which extends rearwardly to a point where it will be accessible to the operator of the vehicle. The forward end of the shift rod 72 is slidable and rotatable in bearings 73 in a cap member 74 that is bolted to the cover 65 over the opening 66. The shifting arm 67 is movable into, and out of, engagement with the forked open ends 681 and 691 of the shifting yokes 68 and 69 and, by a rotatable movement of either the one or the other of the latter, the change-speed pinion which it engages may be moved into or out of mesh with its co-operating change-speed gear. The spring-pressed pins 682 and 692 serve to lock the rods 70 and 71 in their adjusted positions.

The operation of the combined speed-change mechanism, reduction gearing and differential mechanism will be apparent from the foregoing description. It will be seen that I provide a compact rugged transmission mechanism in which all of the operating and wearing parts are completely enclosed to run in oil. All of the parts are also readily accessible for inspection or renewal.

While I have shown and described the construction in detail, it is to be understood that various changes may be made therein without departing from the spirit of the invention and, therefore, I do not wish my invention to be restricted except as required by the appended claims.

I claim as my invention:

1. In a change-speed and differential transmission mechanism for motor tractors, the combination with a casing having openings in its side walls, of a pair of axially-alined driven axles extending through said openings into said casing, a differential mechanism in said casing connected to both of said axles and having an external gear located substantially in the central longitudinal vertical plane of said casing, a rotatable driving shaft and a fixed counter-shaft supported by said walls, said driving shaft extending outside said casing on one side thereof and provided with a power pulley on its outer end, a rotatable sleeve on said counter-shaft, change-speed pinions slidable on said driving shaft, change-speed gears secured on said sleeve and a pinion driven by said gears and meshing with the external gear of the differential mechanism.

2. In a change-speed and differential transmission mechanism for motor tractors, the combination with a casing having openings in its side walls, of a pair of axially-alined driven axles extending through said openings into said casing, a differential mechanism in said casing connected to both of said axles and having an external gear located substantially in the central longitudinal vertical plane of said casing, a rotatable driving shaft and a fixed counter-shaft supported by said walls, said driving shaft extending outside said casing on one side thereof and provided with a power pulley on its outer end, means for supporting the driving shaft at a point intermediate the pulley and the adjacent wall of the said casing, a rotatable sleeve on said counter-shaft, change-speed pinions slidable on said driving shaft, change-speed gears secured on said sleeve and a pinion driven by said gears and meshing with the external gear of the differential mechanism.

3. In a transmission mechanism for motor vehicles, the combination with a casing, of a driving shaft and a counter-shaft carried by the side walls of said casing, change-speed gears on one of said shafts, change-speed pinions on the other shaft, driven shafts journalled in the side walls of said casing and having their axes in the same plane with the axes of the driving shaft and counter-shaft, a reversing counter-shaft in said casing below the plane of the other shafts, reversing pinions on said reversing shaft, a differential mechanism in said casing connected to said driven shafts and comprising an external gear, and a pinion on said first counter-shaft, meshing with said external gear and rotatable by the change-speed members on said first counter-shaft, said external gear and pinion being symmetrically disposed with respect to the central longitudinal vertical plane of said casing.

In testimony whereof, I have hereunto subscribed my name this 15th day of June, 1918.

LESTER H. KEIM.